US011960230B2

(12) United States Patent
Okawa

(10) Patent No.: US 11,960,230 B2
(45) Date of Patent: Apr. 16, 2024

(54) IMAGE FORMING APPARATUS HAVING AN ELECTRICAL SUBSTRATE

(71) Applicant: CANON KABUSHIKI KAISHA, Tokyo (JP)

(72) Inventor: Yuichiro Okawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/826,616

(22) Filed: May 27, 2022

(65) Prior Publication Data

US 2022/0382205 A1 Dec. 1, 2022

(30) Foreign Application Priority Data

May 31, 2021 (JP) ................................ 2021-090732

(51) Int. Cl.
*G03G 15/00* (2006.01)

(52) U.S. Cl.
CPC .................................. *G03G 15/80* (2013.01)

(58) Field of Classification Search
CPC . G03G 15/80; G03G 21/1867; G03G 21/1652
USPC .......................................................... 399/90
See application file for complete search history.

(56) References Cited

U.S. PATENT DOCUMENTS

2017/0075293 A1* 3/2017 Fukasawa .......... G03G 21/1676
2018/0246461 A1* 8/2018 Nakayashiki ...... H01R 13/2421

FOREIGN PATENT DOCUMENTS

JP 2000122511 A * 4/2000 ............ G03G 15/80
JP 2010190974 A 9/2010
JP 2014038353 A 2/2014
JP 2014112175 A 6/2014
JP 2015148726 A 8/2015

OTHER PUBLICATIONS

Computer Translation of J:P2000-122511A to Sunahara Masaru.*

* cited by examiner

*Primary Examiner* — Quana Grainger

(74) *Attorney, Agent, or Firm* — Canon U.S.A., Inc. IP Division

(57) ABSTRACT

An image forming apparatus includes an apparatus main body including an electric substrate and first and second main body electrical contacts electrically connected to the electric substrate, and a cartridge detachably attached to the apparatus main body, wherein the cartridge includes first and second process members, and first and second cartridge electrical contacts electrically connected to the first and second process members, respectively. The apparatus main body includes a common holding member holding a first end portion of the first main body electrical contact and a second end portion of the second main body electrical contact, wherein the holding member is configured to move between a contact position at which the first and second end portions contact with the first and second cartridge electrical contacts, respectively, and a separation position at which the first and second end portions are separated from the first and second cartridge electrical contacts, respectively.

19 Claims, 17 Drawing Sheets

IMAGE FORMING APPARATUS HAVING AN ELECTRICAL SUBSTRATE

BACKGROUND

Field of the Disclosure

The present disclosure relates to an electrophotographic image forming apparatus.

Description of the Related Art

In an electrophotographic image forming apparatus, such as a laser beam printer, a light-emitting diode (LED) printer, and a copying apparatus, a configuration in which a cartridge including a process member such as a developing roller is attachable to and detachable from an apparatus main body is widely adopted. In the configuration, it is necessary to supply power from the apparatus main body to the process member of the cartridge. A configuration in which the cartridge includes a cartridge electrical contact electrically connected to the process member, and the apparatus main body includes a main body electrical contact so as to come into contact with the cartridge electrical contact, is discussed (Japanese Patent Application Laid-Open No. 2010-190974).

In the main body electrical contact discussed in Japanese Patent Application Laid-Open No. 2010-190974, one end on the cartridge side is a spring, which is easily changed in position. Thus, in a case where power having different magnitudes are supplied from a plurality of main body electrical contacts to a plurality of cartridge electrical contacts, it is necessary to increase intervals of the plurality of main body electrical contacts so as not to come into contact with one another. This leads to an issue that the apparatus is easily upsized.

SUMMARY

According to an aspect of the present disclosure, an image forming apparatus includes an apparatus main body including an electric substrate, and a first main body electrical contact and a second main body electrical contact which are electrically connected to the electric substrate, and a cartridge configured to be attachable to and detachable from the apparatus main body. The cartridge includes a first process member, a second process member, a first cartridge electrical contact electrically connected to the first process member, and a second cartridge electrical contact electrically connected to the second process member. The apparatus main body includes a common holding member holding a first end portion of the first main body electrical contact on a side of the cartridge and a second end portion of the second main body electrical contact on a side of the cartridge so as not to cause the first end portion and the second end portion to be electrically connected to each other. The holding member is configured to move between a contact position and a separation position, the contact position being a position at which the first end portion is contactable with the first cartridge electrical contact and the second end portion is contactable with the second cartridge electrical contact, the separation position being a position at which the first end portion is separated from the first cartridge electrical contact so as not to comes into contact with the first cartridge electrical contact and the second end portion is separated from the second cartridge electrical contact so as not to comes into contact with the second cartridge electrical contact.

Further features of the present disclosure will become apparent from the following description of exemplary embodiments with reference to the attached drawings.

DESCRIPTION OF THE EMBODIMENTS

Exemplary embodiments of the present disclosure will be described in detail below with reference to accompanying drawings. However, dimensions, materials, shapes, relative arrangement, etc. of components described in the exemplary embodiments are to be appropriately modified depending on a configuration of an apparatus to which the disclosure is applied and various conditions, and do not limit the scope of the present disclosure to the following exemplary embodiments.

(Image Forming Apparatus)

Figure 1:
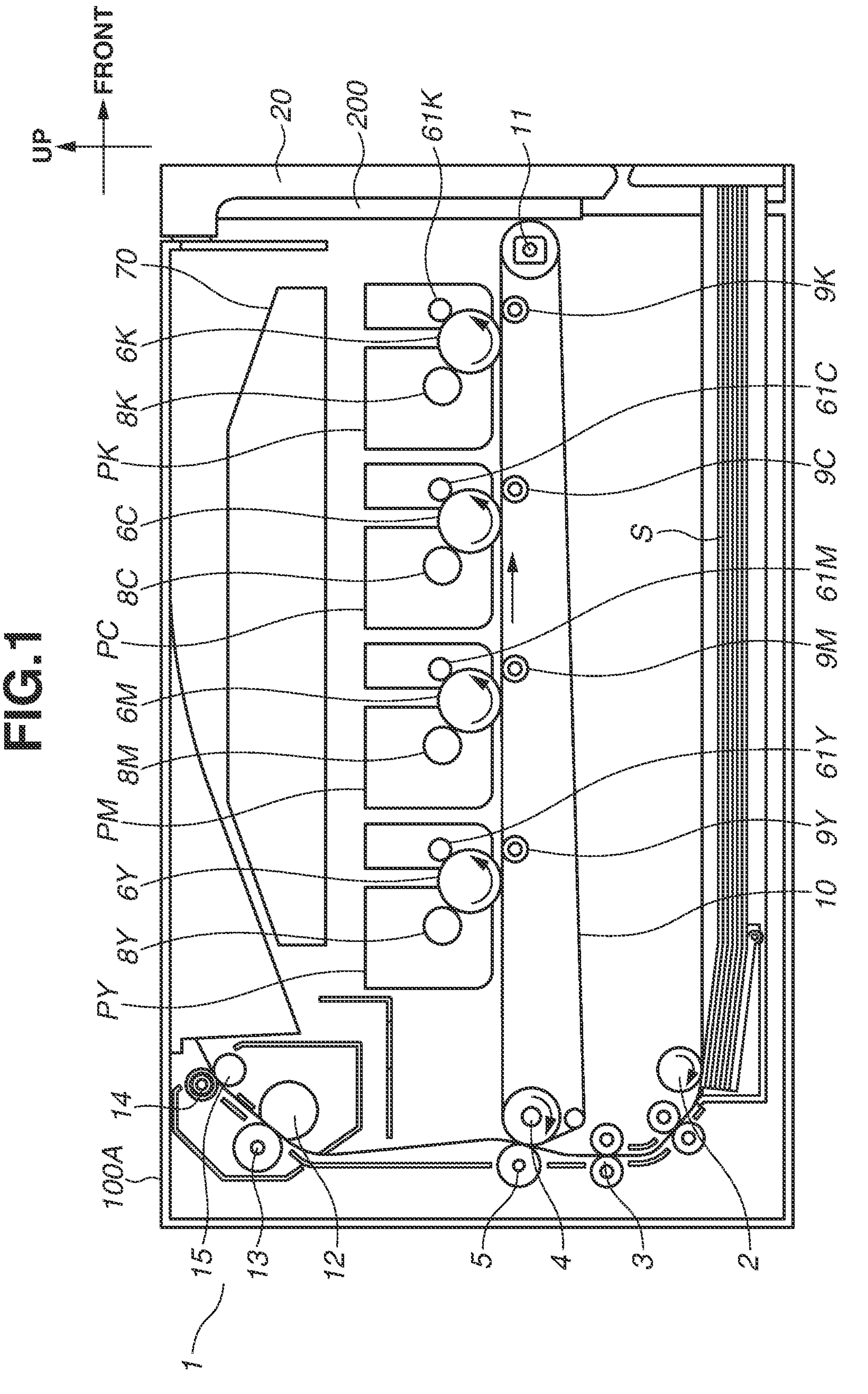
FIG. 1 is a schematic cross-sectional view of an image forming apparatus according to a first exemplary embodiment.

A first exemplary embodiment of the present disclosure will be described below. FIG. 1 is a schematic cross-sectional view of an image forming apparatus according to a first exemplary embodiment. Outline of an entire configuration of the image forming apparatus will be described with reference to FIG. 1.

An image forming apparatus 1 includes an apparatus main body 100A and four cartridges PY, PM, PC, and PK (hereinafter, referred to as cartridges P) attachable to and detachable from the apparatus main body 100A.

Each cartridge P includes a corresponding one of photosensitive drums 6Y, 6M, 6C, and 6K (hereinafter, referred to as photosensitive drums 6) and a corresponding one of developing rollers 8Y, 8M, 8C, and 8K (hereinafter, referred to as developing rollers 8). Each cartridge P includes a corresponding one of charging rollers 61Y, 61M, 61C, and 61K (hereinafter, referred to as charging rollers 61).

The apparatus main body 100A includes, as main components, a conveyance unit for feeding and conveying a recording material S, image forming units each forming an image on the recording material S, and a fixing unit for fixing the image on the recording material S.

The conveyance unit includes a feeding roller 2 and conveyance rollers 3. The recording material S stored in a feeding tray 1 is fed by the feeding roller 2, and is sent, via the conveyance rollers 3, to a transfer nip portion formed by an inner belt driving roller 4 and a secondary transfer roller 5 with an intermediate transfer belt 10 in between.

The image forming units include a laser scanner 70 and the intermediate transfer belt 10 in addition to the photosensitive drums 6 and the developing rollers 8 provided in the cartridges P. The photosensitive drums 6 rotate in a counterclockwise direction in FIG. 1. In the image forming units, an electrostatic latent image is sequentially formed by laser beams from the laser scanner 70 on an outer peripheral surface of the respective photosensitive drums 6 changed to a negative polarity by the charging rollers 61. The developing rollers 8 carry toner. The toner charged to the negative polarity is supplied from the developing rollers 8, so that the electrostatic latent images on the photosensitive drums 6 are developed, and toner images are formed on the photosensitive drums 6. The toner images formed on the photosensitive drums 6 are each transferred to the intermediate transfer belt 10 by primary transfer units 9Y, 9M, 9C, and 9K (hereinafter, referred to as primary transfer units 9). The intermediate transfer belt 10 is a cylindrical film stretched on the inner belt driving roller 4, a tension roller 11, and the like. The inner belt driving roller 4 is rotationally driven in a clockwise direction in FIG. 1, so that the intermediate transfer belt 10 moves at a speed substantially equal to a moving speed of surfaces of the photosensitive drums 6.

To form a color image, toner images of yellow, magenta, cyan, and black are each developed on the corresponding one of the photosensitive drums 6, and the formed toner images are sequentially transferred to the intermediate transfer belt 10 by the primary transfer units 9. Next, the toner images formed on the intermediate transfer belt 10 are collectively transferred to the recording material S sent to the transfer nip portion. Further, the recording material S on which the toner images have been transferred is sent to a fixing nip portion formed by a heating unit 12 and a pressurizing roller 13. The toner images are fixed onto the recording material S by being heated and pressurized by the fixing nip portion. The recording material S onto which the toner images have been fixed is conveyed and discharged by a discharge roller 14 and a discharge driven roller 15.

(Cartridge Tray)

Figure 2:
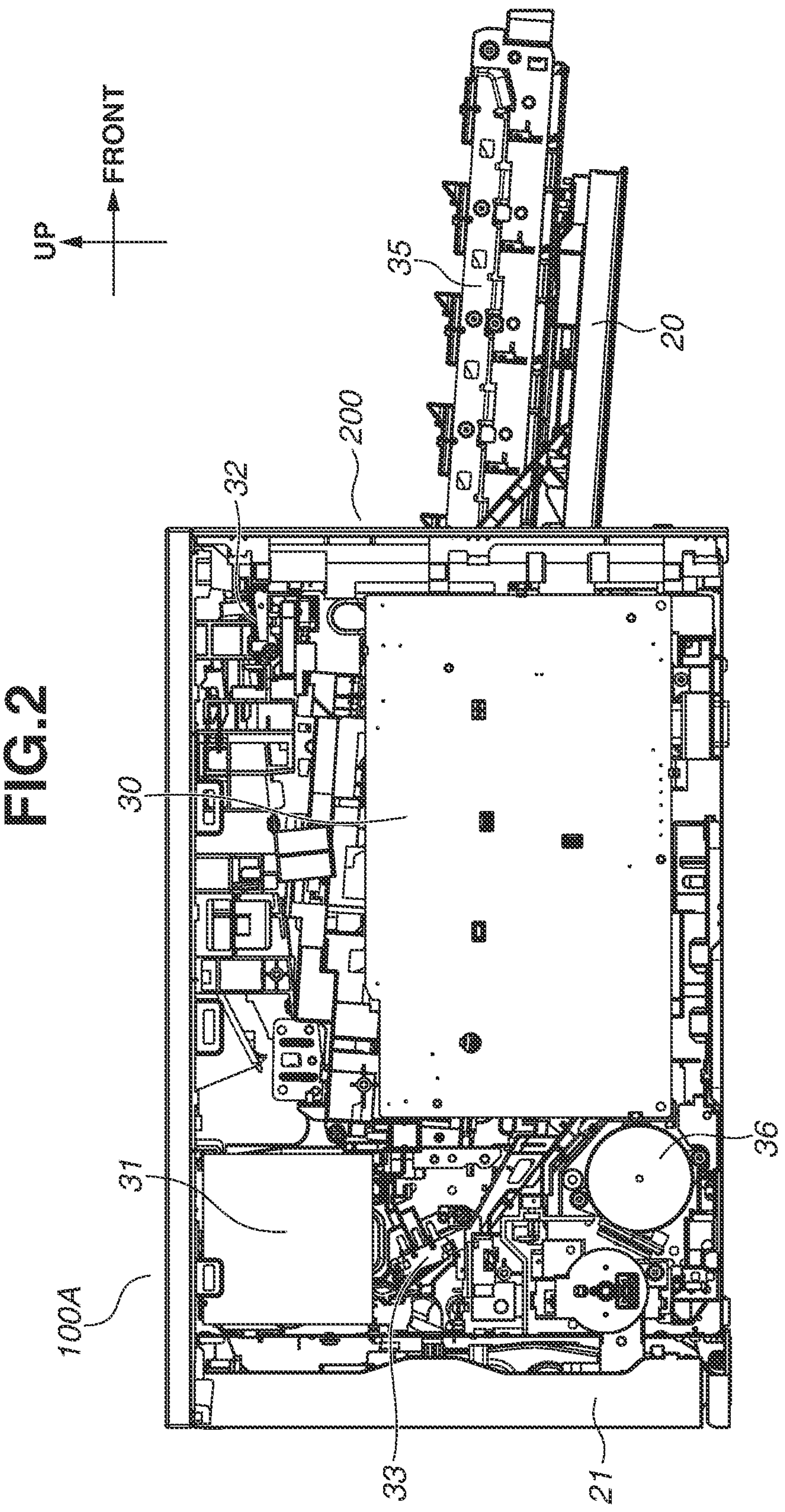
FIG. 2 is a side view of an apparatus main body in a case where an exterior cover is not illustrated with a cartridge tray drawn out.

FIG. 2 illustrates the apparatus main body 100A in a case where an exterior cover on a left side surface of the apparatus main body 100A is not illustrated while a cartridge tray 35 is drawn out. The cartridges P are not mounted on the cartridge tray 35 in FIG. 2.

The apparatus main body 100A includes the cartridge tray 35 on which the cartridges P are mountable.

The cartridge tray 35 is movable between a first position (image formation position) at which image formation is performable by using the cartridges P and a second position (attachment and detachment position) at which the cartridges P are attachable to and detachable from the cartridge tray 35. The apparatus main body 100A has an opening 200 through which the cartridges P pass when the cartridge tray 35 moves from the second position to the first position. The first position is inside the apparatus main body 100A.

As illustrated in FIG. 1 and FIG. 2, the apparatus main body 100A further includes a front cover 20 (openable/closable member) to open and close the opening 200. The front cover 20 illustrated in FIG. 1 is at a closing position at which the opening 200 is closed. The front cover 20 illustrated in FIG. 2 is at a position at which the opening 200 is opened.

An electric substrate 30 for supplying necessary power to the cartridges P and the like is disposed on the left side surface of the apparatus main body 100A. Further, a control substrate 31 that processes image information transmitted from an external information apparatus such as a computer is disposed behind and above the electric substrate 30. The control substrate 31 is connected to the external information apparatus with an external connection cable connector, and the electric substrate 30 and the control substrate 31 are electrically coupled by bundled wires and a flexible flat cable (not illustrated).

Interlock switches 32 and 33 are respectively disposed on a front side and a rear side of the apparatus main body 100. The interlock switches 32 and 33 respectively detect opening and closing operation of the front cover 20 and a rear cover 21, and prevents operation of the apparatus main body 100A while the rear cover 21 is opened. The rear cover 21 is provided to enable, when a sheet conveyed by the conveyance rollers 3 and the secondary transfer roller 5 is jammed, removal of the jammed sheet. When the front cover 20 is opened, the cartridge tray 35 becomes movable between the first position and the second position. The cartridge tray 35 is slidable in a front-rear direction of the apparatus main body 100A, or in a direction orthogonal to a rotation axis direction of each of the photosensitive drums 6. A feeding motor 36 transmits driving force to the feeding roller 2 and the conveyance rollers 3.

(Cartridge Electrical Contact)

Figure 3B:
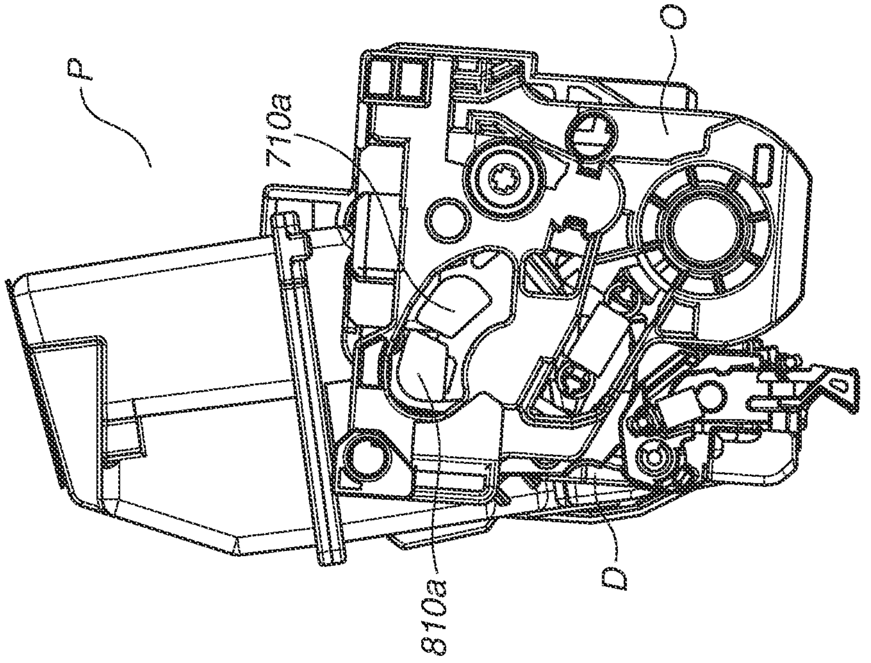
FIGS. 3A and 3B are a perspective view and a side view of a cartridge, respectively, according to the first exemplary embodiment.
Figure 3A:
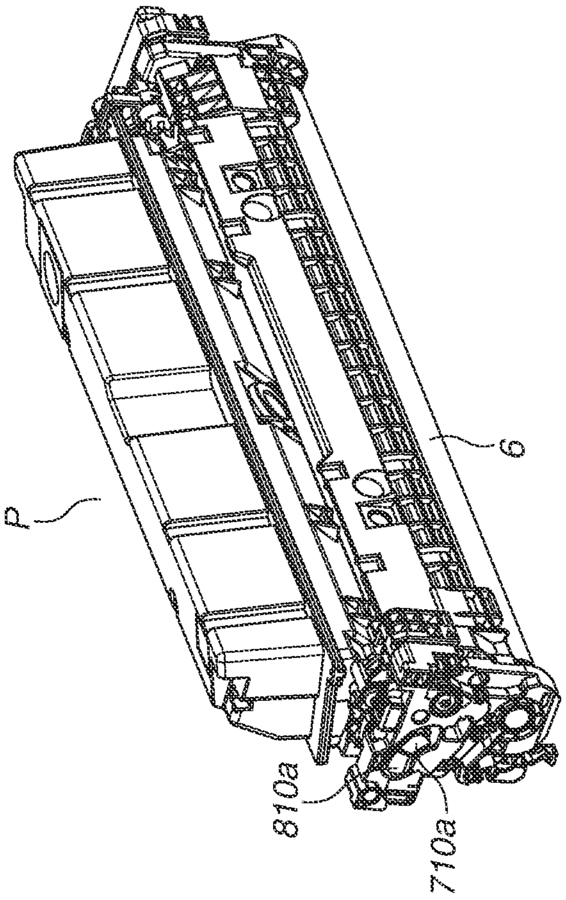
Figure 4:
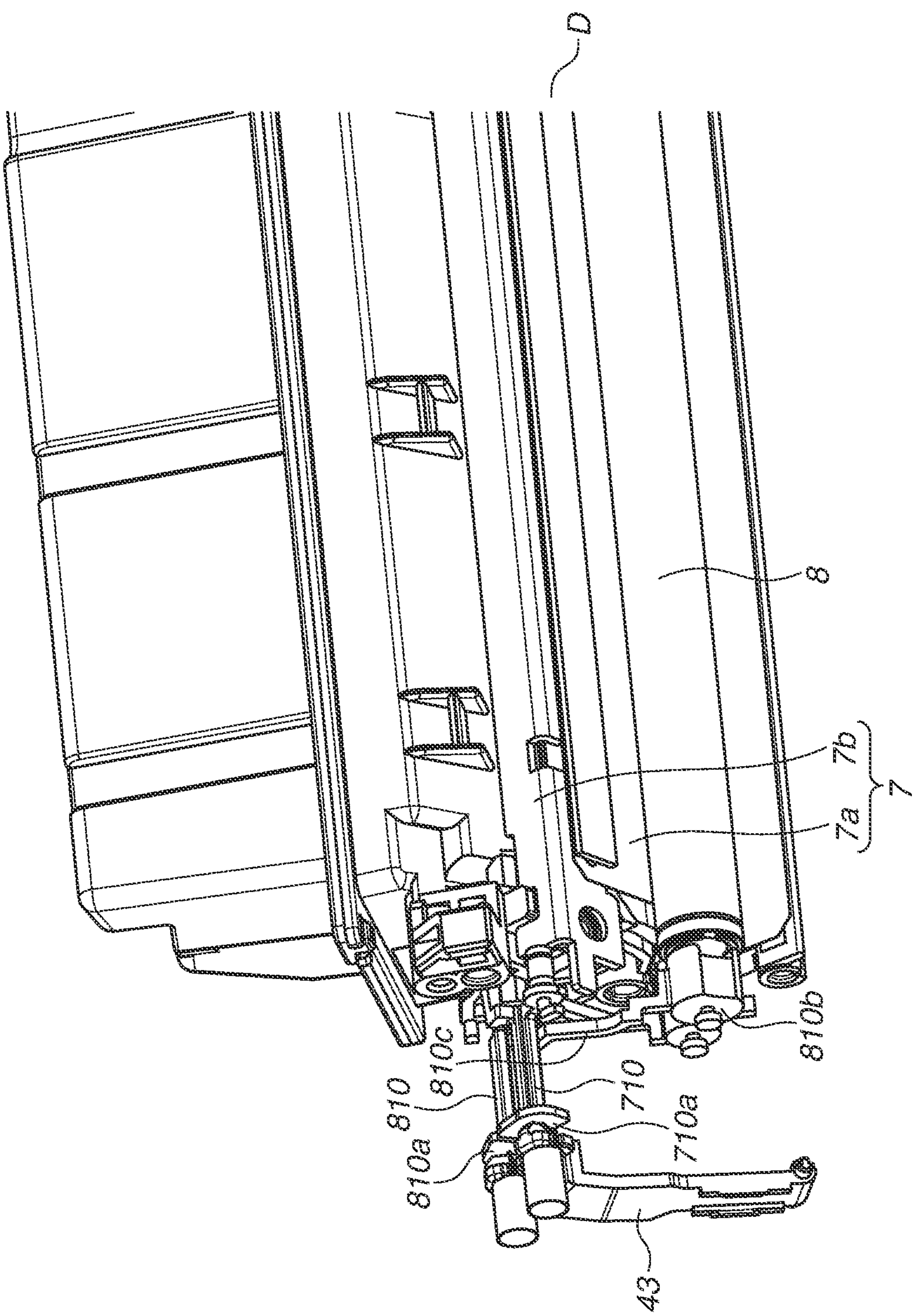
FIG. 4 is a perspective view of the cartridge and main body electrical contacts in a state where a drum unit is not illustrated, according to the first exemplary embodiment.

FIG. 3A is a perspective view of one cartridge P. FIG. 3B is a side view of the cartridge P. FIG. 4 is a perspective view of the cartridge P and main body electrical contacts in a state where a drum unit O is not illustrated to facilitate viewing. Each cartridge P includes a drum unit O and a developing unit D that is swingable to the drum unit O. The drum unit O includes the photosensitive drum 6 and the charging roller 61 (FIG. 1). Each developing unit D includes the developing roller 8 and a developing blade 7 serving as a layer thickness regulation member for regulating a layer thickness of the toner of the developing roller 8.

Each developing blade 7 includes a blade 7*a* and a supporting member 7*b* for supporting the blade 7*a*. In the present exemplary embodiment, the blade 7*a* is a thin plate (metal plate) made of stainless steel (SUS). The supporting member 7*b* is a plate that is made of iron and has an L-shaped cross-section orthogonal to a longitudinal direction. Thus, the developing blade 7 has conductivity.

Each developing unit D includes a developing electrical contact 810 (first cartridge electrical contact) electrically connected to the corresponding developing roller 8, and a blade electrical contact 710 (second cartridge electrical contact) electrically connected to the corresponding developing blade 7.

Here, a phrase "two members are electrically connected" may mean that the two members come into direct contact with each other, or one or a plurality of conductive members is provided between the two members and a conductive path is formed between the two members through the conductive members.

The developing electrical contact 810 includes a first contact portion 810*a* which comes into contact with a main body electrical contact of the apparatus main body 100A, a first bearing portion 810*b* for rotatably supporting the corresponding developing roller 8, and a first contact portion 810*c* (coupling portion) which is connected to the first contact portion 810*a* and the bearing portion 810*b*. The developing electrical contact 810 is made of a conductive resin.

The blade electrical contact 710 includes a second contact portion 710*a* (contact portion) configured to come into contact with a main body electrical contact as illustrated in FIG. 4, and is electrically connected to the supporting member 7*b* of the corresponding developing blade 7. The developing electrical contact 810 and the developing blade electrical contact 710 are each made from a conductive resin.

Figure 5:
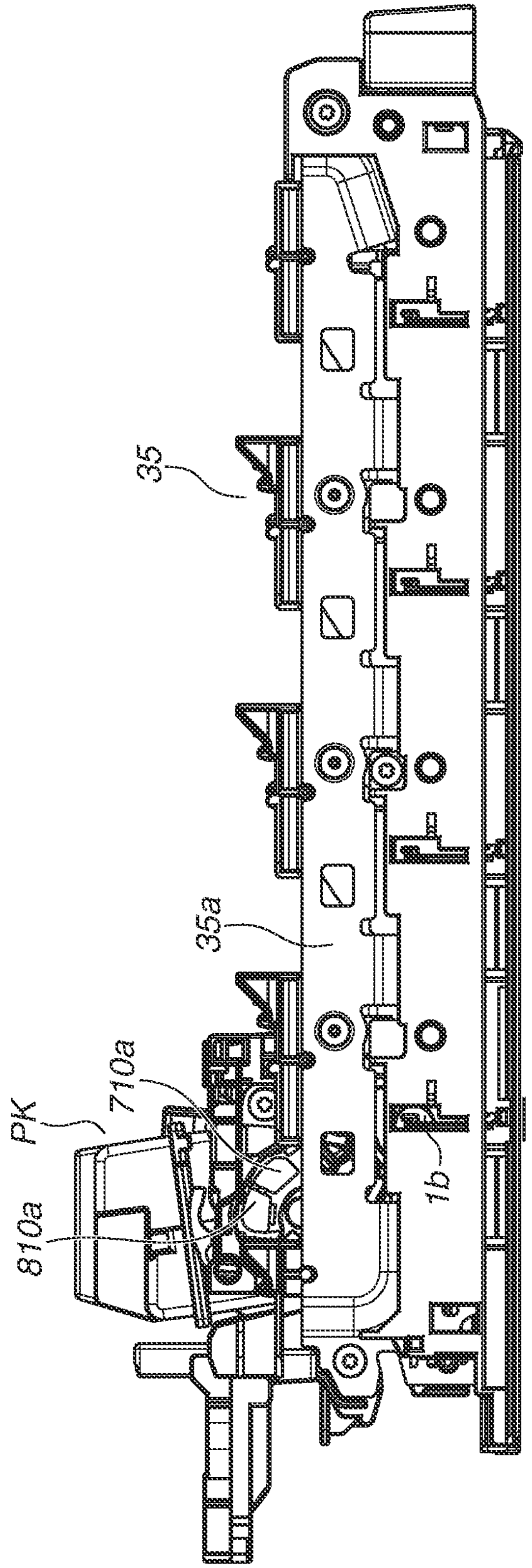
FIG. 5 is aside view of the image forming apparatus in a state where the cartridge is placed on the cartridge tray according to the first exemplary embodiment.

FIG. 5 is a side view illustrating a state where the cartridge PK of black is placed on the cartridge tray 35. The first contact portion 810*a* of the developing electrical contact 810 and the second contact portion 710*a* of the blade electrical contact 710 of the cartridge PK are positioned above an upper end of a side wall 35*a* of the cartridge tray 35. Thus, even in a case where the cartridge tray 35 is moved to the first position, the first contact portion 810*a* and the second contact portion 710*a* are contactable with the main body electrical contacts.

(Main Body Electrical Contact)

Figure 6:
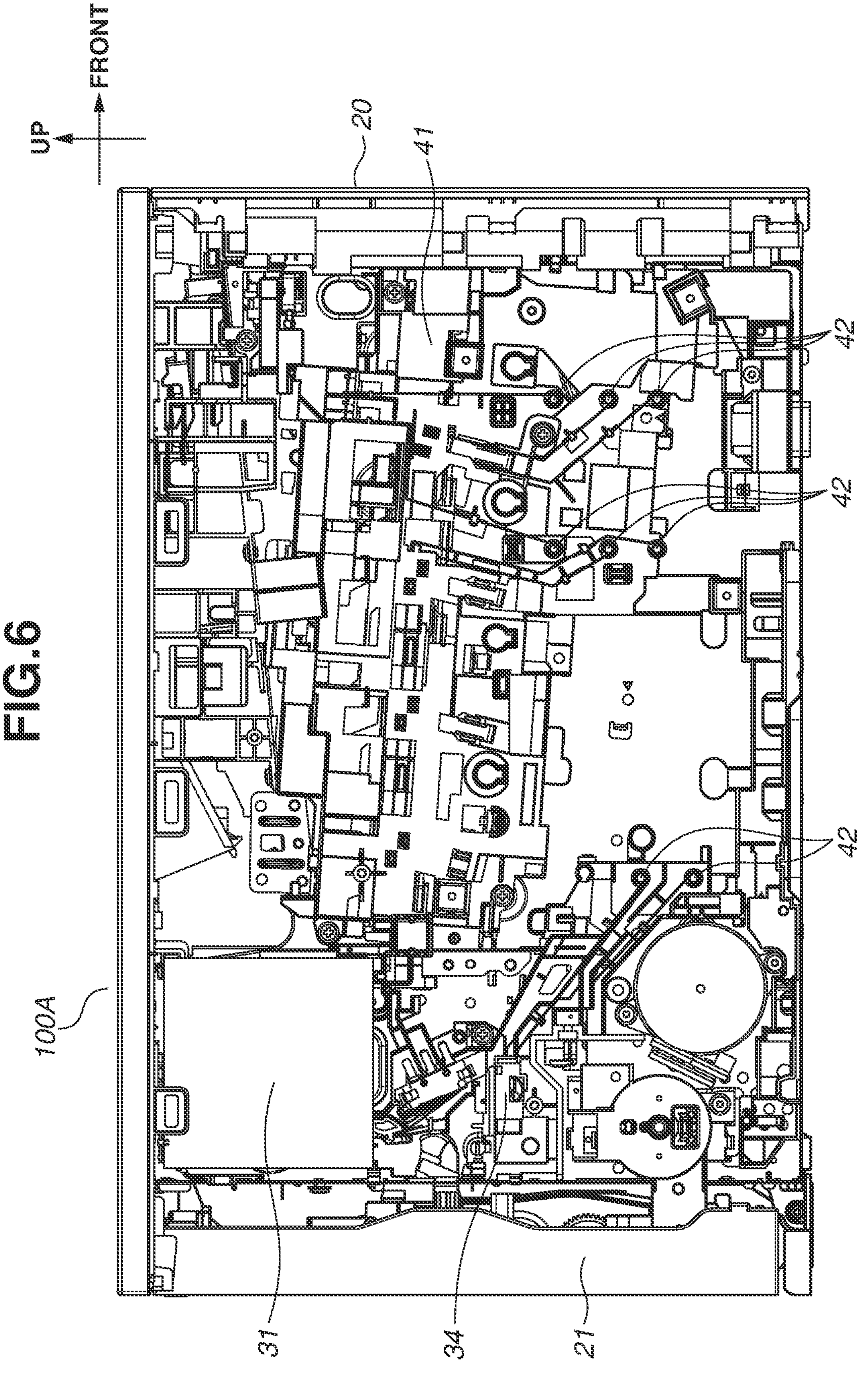
FIG. 6 is a side view of the apparatus main body in a state where an electric substrate is not illustrated, according to the first exemplary embodiment.

A configuration of the main body electrical contacts of the apparatus main body 100A according to the present exemplary embodiment will be described. FIG. 6 is a side view of the apparatus main body 100A in a case where the electric substrate 30 according to the present exemplary embodiment is not illustrated. Coils 42, which are conductive members, are held by a contact holder 41. A contact holder unit 40 includes the contact holder 41 and the coils 42 held by the contact holder 41. The contact holder 41 is made from an insulating resin.

The coils 42 are electrically connected to the developing rollers 8 (first process members) of the developing units D, the developing blades 7 (second process members), and the charging rollers 61 (third process members). The coils 42 holds an interlock of the rear cover 21. Two coils 42 are disposed also on a rear cover holder 34, and supply power to the primary transfer units 9 and the secondary transfer roller 5.

Figure 7:
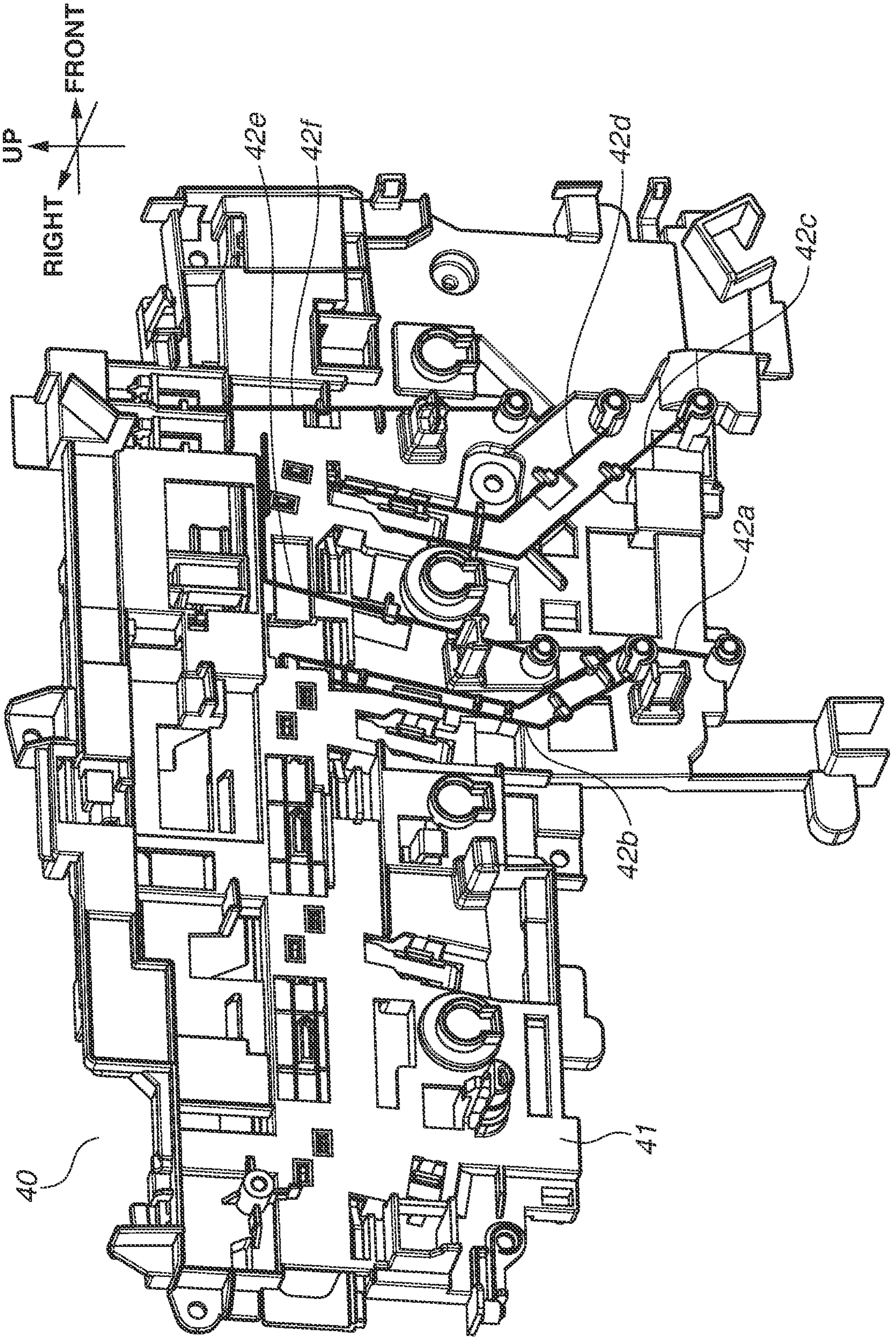
FIG. 7 is a perspective view of a contact holder unit as viewed from the electric substrate side according to the first exemplary embodiment.
Figure 8:
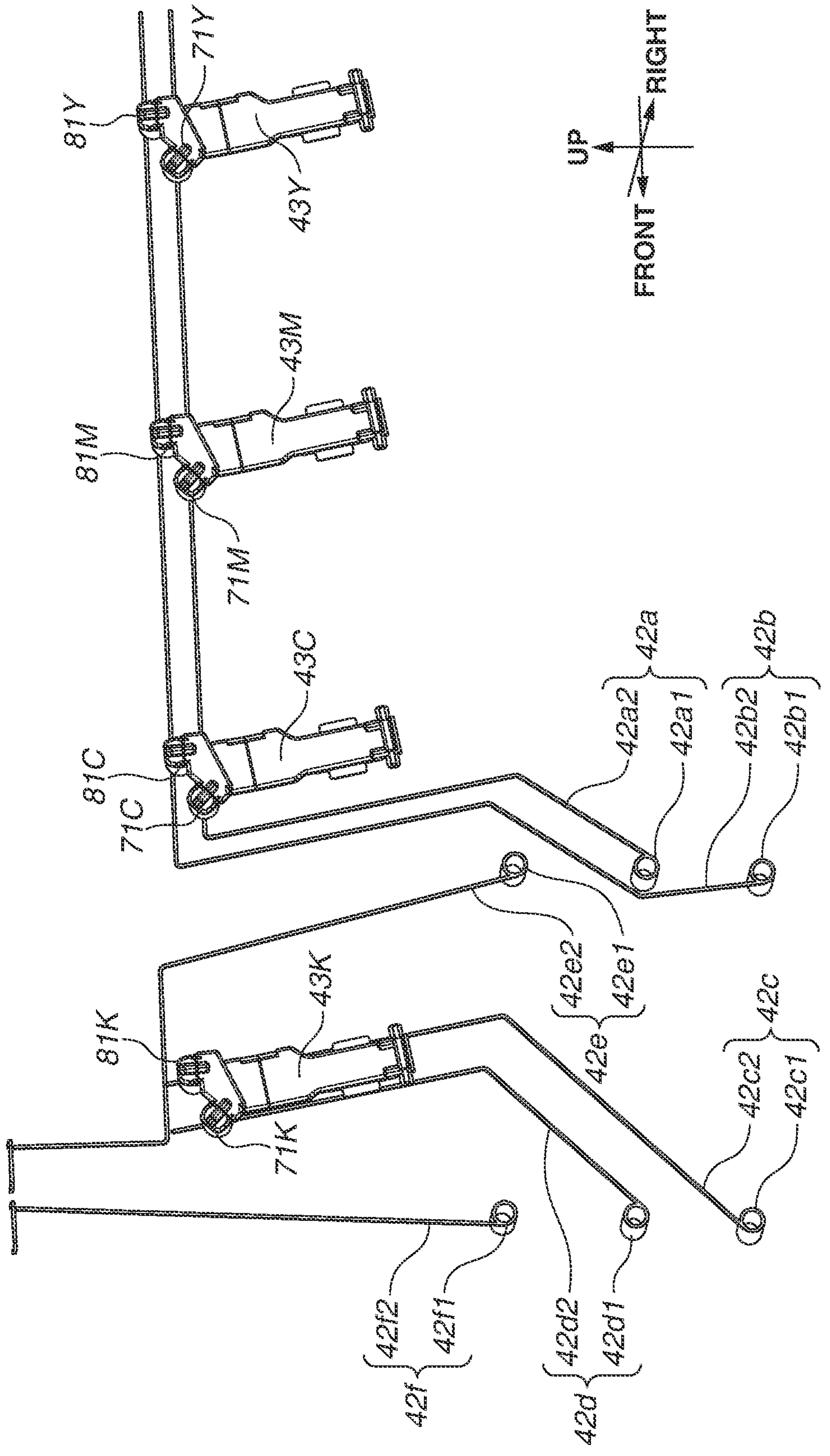
FIG. 8 is a perspective view of coils, main body electrical contacts, and holding members as viewed from the cartridge side, according to the first exemplary embodiment.

FIG. 7 is a perspective view of the contact holder unit 40 as viewed from the electric substrate 30 side. FIG. 8 is a perspective view of the coils 42, the main body electrical contacts, and holding members as viewed from the cartridge P side.

The coils 42 includes coils 42*a*, 42*b*, 42*c*, 42*d*, 42*e*, and 42*f* (hereinafter, referred to as coils 42*a* to 42*f*). The coils 42*a* to 42*f* respectively include coil spring portions 42*a*1, 42*b*1, 42*c*1, 42*d*1, 42*e*1, and 42*f*1 (hereinafter, referred to as coil spring portions 42*a*1 to 42*f*1) each wound in a spiral shape at ends thereof on a side close to the electric substrate 30. The coils 42*a* to 42*f* further include linear portions 42*a*2, 42*b*2, 42*c*2, 42*d*2, 42*e*2, and 42*f*2 (hereinafter, referred to as linear portions 42*a*2 to 42*f*2) extending from the coil spring portions 42*a*1 to 42*f*1, respectively. The coil spring portions 42*a*1 to 42*f*1 are in electrical contact with respective contacts (not illustrated) of the electric substrate 30 while being compressed.

As illustrated in FIG. 8, the coils 42*a* and 42*b* form at least a part of a conductive path for supplying the same power to the developing blades 7 and the developing rollers 8 of yellow, magenta, and cyan (hereinafter, referred to as colors). The coils 42*c* and 42*d* form at least a part of a conductive path for supplying power to the developing roller 8 and the developing blade 7 of black. The coil 42*e* supplies power having the same magnitude to the charging rollers 61 of the colors. The coil 42*f* supplies power to the charging roller 61 of the drum unit O of black.

In the image forming apparatus 1 according to the present exemplary embodiment, the power having different magnitudes are supplied to the developing rollers 8 and the developing blades 7 in order to prevent toner melt adhesion. More specifically, a developing roller bias applied to the respective developing rollers 8 is −500 V, and a developing blade bias applied to the respective developing blades 7 is −600 V. Thus, it is necessary for the conductive paths which supply the power to the developing rollers 8 and the conductive paths which supply the power to the developing blades 7 to be independent of each other.

In the present exemplary embodiment, the power is independently supplied to the developing units D of the colors and the developing unit D of black, in order to make the power supplied to the developing rollers 8 and the developing blades 7 of the colors in monochrome printing less than the power in color printing, or to make the power in monochrome printing zero. The color printing described herein indicates that an image is formed on the recording material S by using the image forming units of both of the colors and monochrome, and the monochrome printing indicates that an image is formed on the recording material S only by using the image forming unit of black.

Next, the main body electrical contacts which form, with the coils 42, the conductive paths for supplying power to the developing rollers 8 and the developing blades 7 will be described. In a case of the image forming unit of yellow among the image forming units of the four colors, the apparatus main body 100A includes a first main body electrical contact 81Y and a second main body electrical contact 71Y which serve as the main body electrical contacts as illustrated in FIG. 8. The first main body electrical contact 81Y and the second main body electrical contact 71Y are configured to respectively come into electrical contact with the developing electrical contact 810 and the blade electrical contact 710 of the corresponding developing unit D. The apparatus main body 100A further includes a holding member 43Y which holds the first main body electrical contact 81Y and the second main body electrical contact 71Y. The image forming units of magenta, cyan, and black each have the configuration same as the configuration of the image forming unit of yellow. Thus, descriptions thereof are omitted.

The linear portion 42*a*2 of the coil 42*a* is in contact with second main body electrical contacts 71Y, 71M, and 71C. The linear portion 42*b*2 of the coil 42B is in contact with first main body electrical contacts 81Y, 81M, and 81C.

Figure 9B:
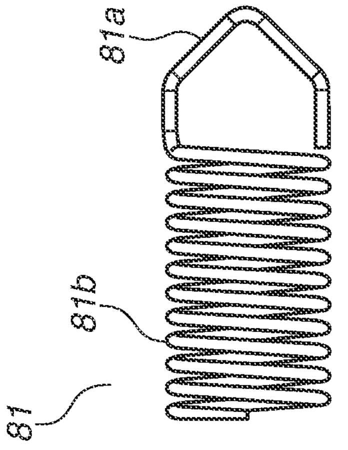
FIG. 9B and FIG. 9C are detailed diagrams of the respective main body electrical contact.
Figure 9C:
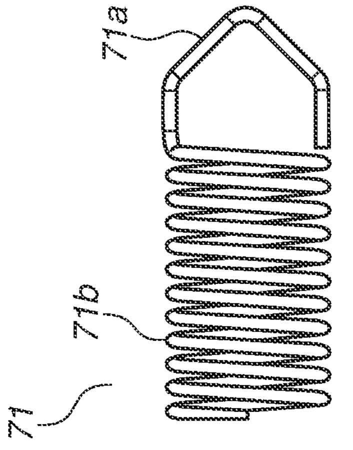
Figure 9A:
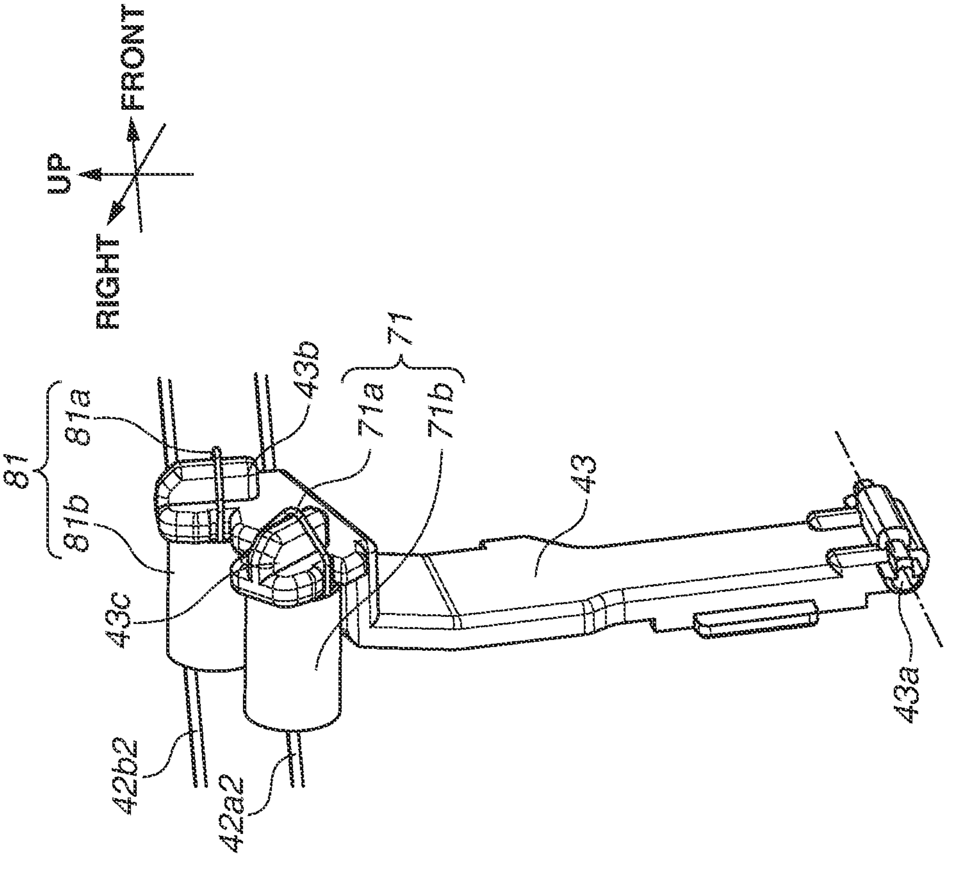
FIG. 9A is a perspective view of the main body electrical contacts and the holding member according to the first exemplary embodiment.
Figure 10A:
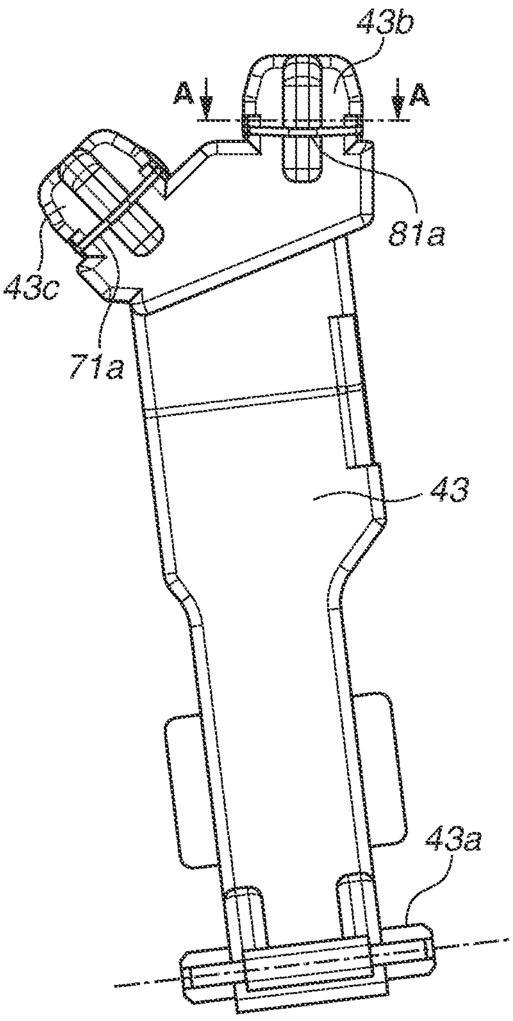
FIGS. 10A and 10B are each a front view of the holding member for holding the main body electrical contacts according to the first exemplary embodiment.
Figure 10B:
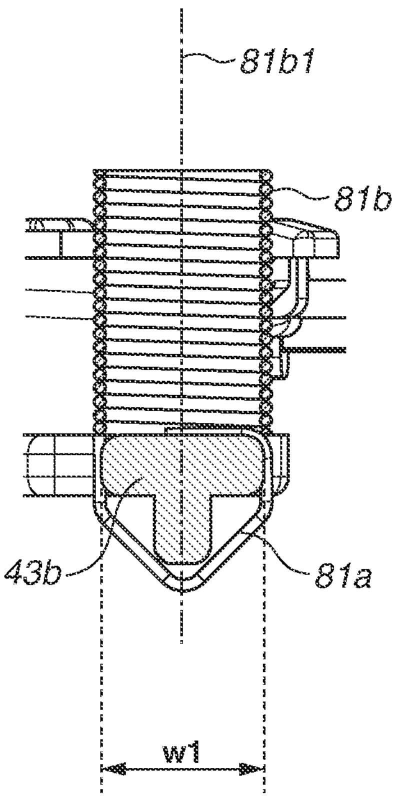

FIG. 9A is an enlarged perspective view of a holding member 43 which holds a first main body electrical contact 81 and a second main body electrical contact 71. FIG. 9B and FIG. 9C are detailed diagrams of the first main body electrical contact 81 and the second main body electrical contact 71, respectively. FIG. 10A is a front view of the holding member 43 which holds the first main body electrical contact 81 and the second main body electrical contact 71. FIG. 10B illustrates a cross-section taken along line A-A in FIG. 10A.

As illustrated in FIG. 9A and FIG. 10A, the holding member 43 includes a first holding portion 43*b* and a second holding portion 43*c*. The first holding portion 43*b* and the second holding portion 43*c* respectively hold the first main body electrical contact 81 and the second main body electrical contact 71. The holding member 43 includes, in a longitudinal direction of the holding member 43, the first holding portion 43*b* and the second holding portion 43*c* at one end thereof, and includes a swing shaft portion 43*a* (swing axis) at the other end. The holding member 43 is swingable to the corresponding cartridge P with the swing shaft portion 43*a* as the center.

As illustrated in FIG. 9B, the first main body electrical contact 81 includes a first coil spring portion 81*b* wound in a spiral shape around a spiral axis extending toward the corresponding cartridge P. The first main body electrical contact 81 further includes a first bent portion 81*a* (first end portion) in which a coil end is bent to form a humped curve (convex curved portion) on the corresponding cartridge P side, at one end of the first coil spring portion 81*b* on the corresponding cartridge P side.

As illustrated in FIG. 9C, the second main body electrical contact 71 includes a second coil spring portion 71*b* wound in a spiral shape about a spiral axis which extends toward the corresponding cartridge P. The second main body electrical contact 71 further includes a second bent portion 71*a* (second end portion) in which a coil end is bent to form a humped curve (convex curved portion) on the corresponding cartridge P side, at one end of the second coil spring portion 71*b* on the corresponding cartridge P side. The first bent portion 81*a* and the second bent portion 71*a* respectively come into contact with the first contact portion 810*a* of the developing electrical contact 810 and the second contact portion 710*a* of the blade electrical contact 710. The first bent portion 81*a* is brought into pressure contact with the first contact portion 810*a* of the developing electrical contact 810 by spring force of the first coil spring portion 81*b*. The second coil spring portion 71*b* is brought into pressure contact with the second contact portion 710*a* of the blade electrical contact 710 by spring force of the second coil spring portion 71*b*. The first coil spring portion 81*b* and the second coil spring portion 71*b* according to the present exemplary embodiment are compression coil spring portions, but may be torsion coil spring portions.

The first holding portion 43*b* (first press-fitted portion) and the second holding portion 43*c* (second press-fitted portion) of the holding member 43 illustrated in FIG. 9A are each a rib (protrusion), and are respectively press-fitted into the first bent portion 81*a* and the second bent portion 71*a*. More specifically, as illustrated in FIG. 10B, the first holding portion 43*b* having a width w1 in a direction orthogonal to a spiral axis 81*b*1 of the first coil spring portion 81*b* is inserted into the first bent portion 81*a* having a width narrower than the width w1 while pushing and expanding the first bent portion 81*a* from an inside toward an outside. The second holding portion 43*c* has a configuration similar to the configuration of the first holding portion 43*b*, and holds the second bent portion 71*a* of the second main body electrical contact 71.

The first coil spring portion 81*b* and the second coil spring portion 71*b* are easily changed in position. However, since the first bent portion 81*a* and the second bent portion 71*a* at the ends on the cartridge P side are held by the common holding member 43, a distance between the first bent portion 81*a* and the second bent portion 71*a* can be maintained with high accuracy. Thus, the distance between the first bent portion 81*a* (first main body electrical contact 81) and the second bent portion 71*a* (second main body electrical contact) can be reduced. This makes it possible to downsize the main body electrical contacts. Further, the areas of the first contact portion 810*a* of the developing electrical contact 810 and the second contact portion 710*a* of the blade electrical contact 710 of each cartridge P can be reduced, which makes it possible to downsize each developing unit D (each cartridge P).

Figure 11:
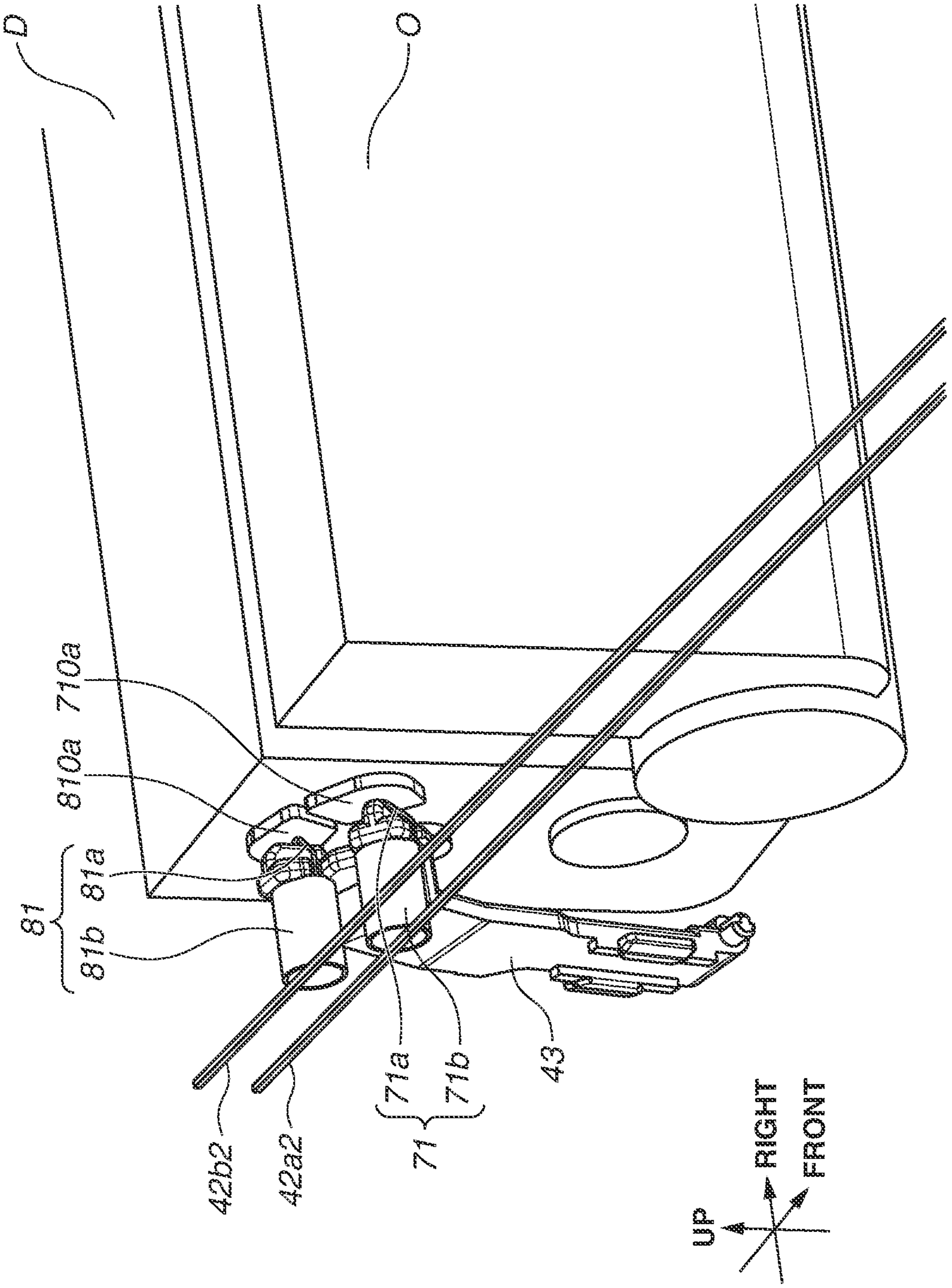
FIG. 11 is a perspective view of the cartridge and the main body electrical contacts in a state where the main body electrical contacts are in contact with cartridge electrical contacts, according to the first exemplary embodiment.

FIG. 11 is a perspective view of the cartridge P and the main body electrical contacts in a state where the first main body electrical contact 81 and the second main body electrical contact 71 are respectively in contact with the developing electrical contact 810 and the blade electrical contact 710.

As illustrated in FIG. 11, the linear portion 42*b*2 of the coil 42*b* is in electrical contact with an end of the first coil spring portion 81*b* of the first main body electrical contact 81 on a side opposite to the side provided with the first bent portion 81*a*. The linear portion 42*a*2 of the coil 42*a* is in electrical contact with an end of the second coil spring portion 71*b* of the second main body electrical contact 71 on a side opposite to the side provided with the second bent portion 71*a*.

The first bent portion 81*a* of the first main body electrical contact 81 and the second bent portion 71*a* of the second main body electrical contact 71 are respectively in contact with the first contact portion 810*a* of the developing electrical contact 810 and the second contact portion 710*a* of the blade electrical contact 710. The electric substrate 30, the coil 42*b*, the first main body electrical contact 81, the developing electrical contact 810, and the developing roller 8 form the conductive path in this order, and the power is supplied to the developing roller 8. The electric substrate 30, the coil 42*a*, the second main body electrical contact 71, the blade electrical contact 710, and the developing blade 7 form the conductive path in this order, and the power is supplied to the developing blade 7.

(Moving Mechanism for Holding Member)

Figure 12:
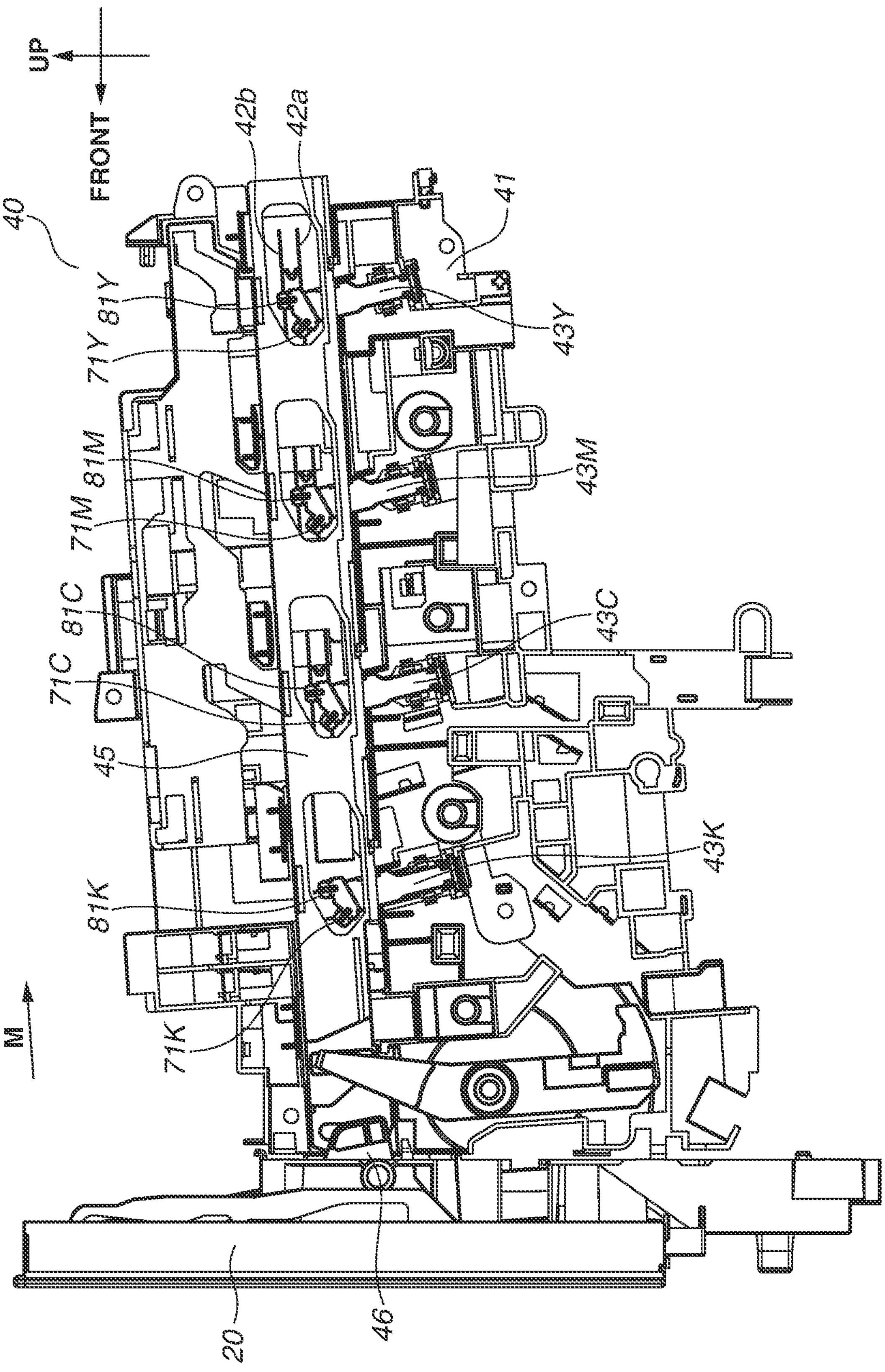
FIG. 12 is a side view of the apparatus main body when a front cover is at a closing position, according to the first exemplary embodiment.
Figure 13:
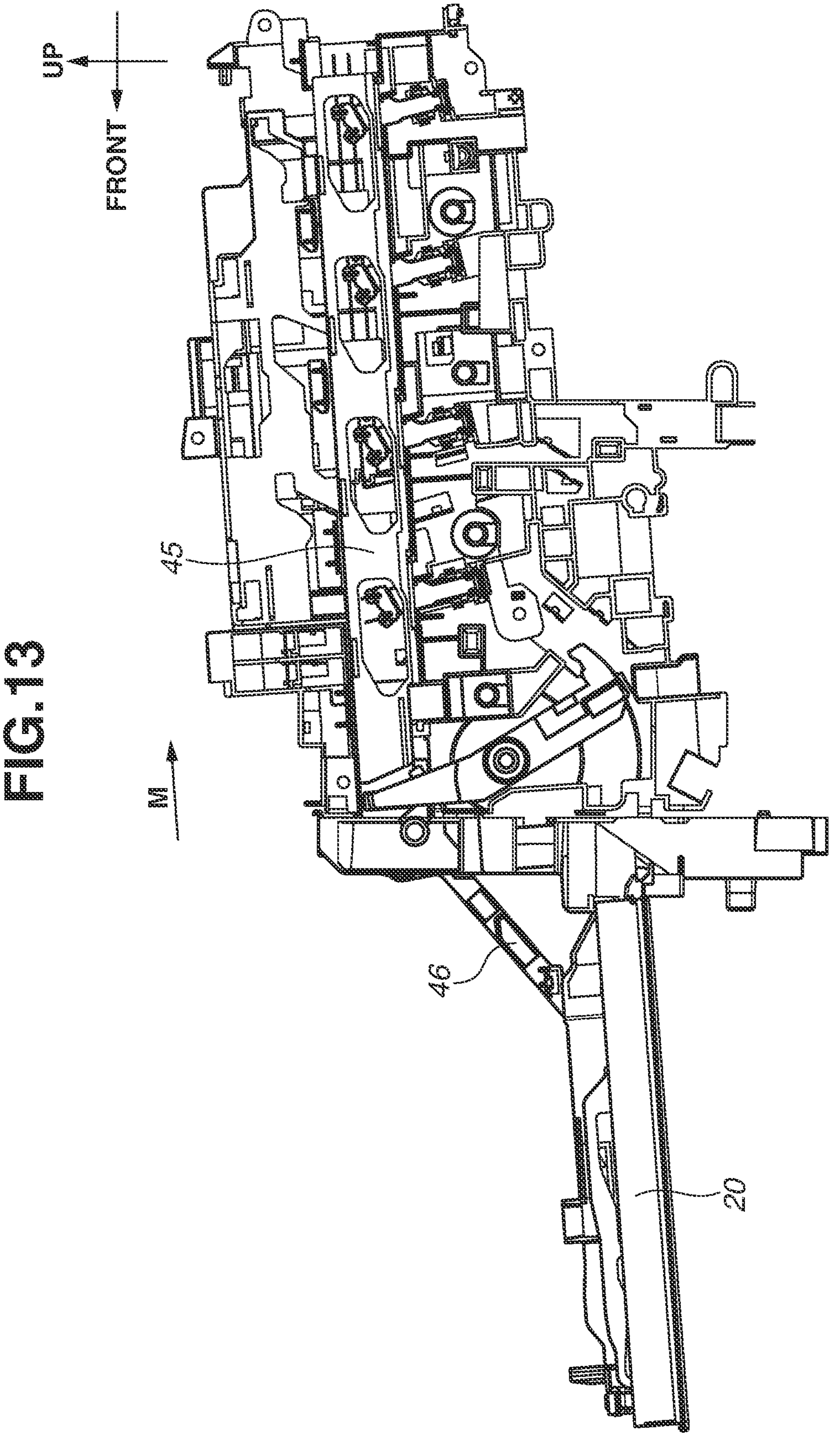
FIG. 13 is a side view of the apparatus main body when the front cover is at an opening position, according to the first exemplary embodiment.

A moving mechanism for the holding member 43 will be described. FIG. 12 is a side view of the apparatus main body 100*a* when the front cover 20 is at the closing position. FIG. 13 is a side view of the apparatus main body 100A when the front cover 20 is at the opening position. As illustrated in FIG. 12 and FIG. 13, the apparatus main body 100A includes a slide member 45 slidable in an attachment direction M of the cartridge tray 35 and in a direction opposite thereto. The apparatus main body 100A further includes a link member 46 which links the front cover 20 and the slide member 45 such that the slide member 45 slides in conjunction with movement of the front cover 20 between the opening position and the closing position. When the front cover 20 is at the closing position, the slide member 45 is at a downstream-side position on a downstream in the attachment direction M of the cartridge tray 35. When the front cover 20 is at the opening position, the slide member 45 is at an upstream-side position on an upstream of the downstream-side position in the attachment direction M.

Figure 14C:
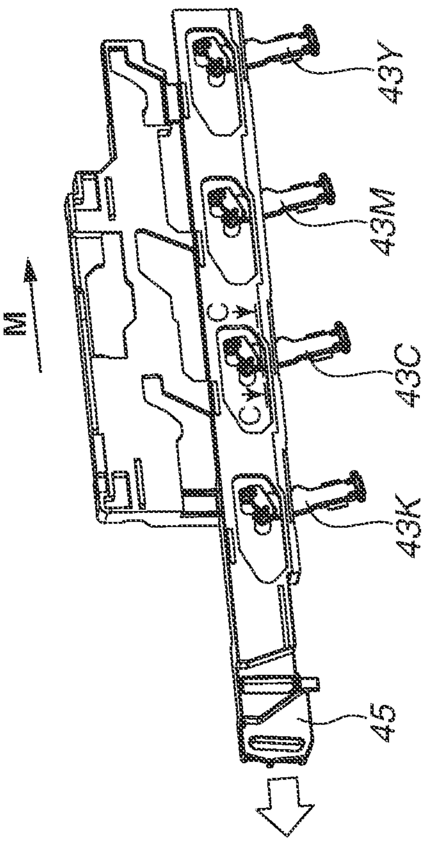
FIGS. 14A to 14D are diagrams each illustrating an interlocking mechanism of the front cover, a slide member, and the holding members, according to the first exemplary embodiment.
Figure 14D:
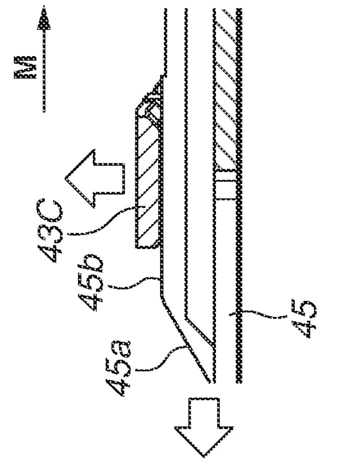
Figure 14A:
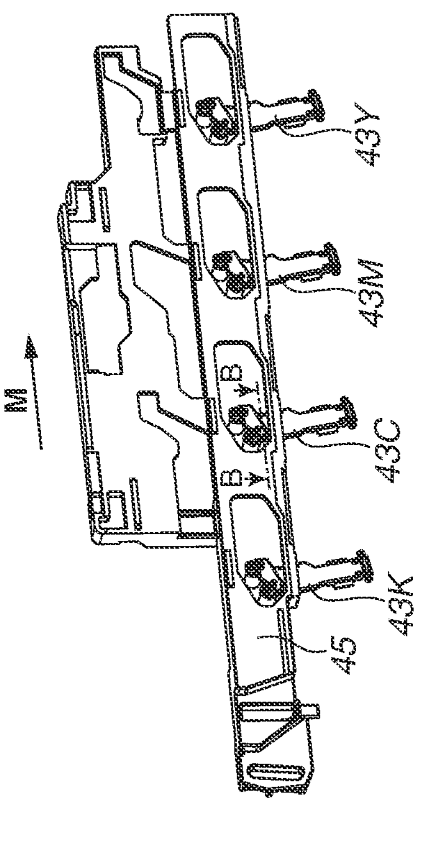
Figure 14B:
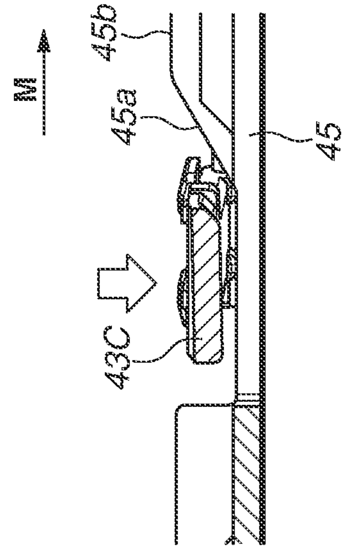
Figure 15:
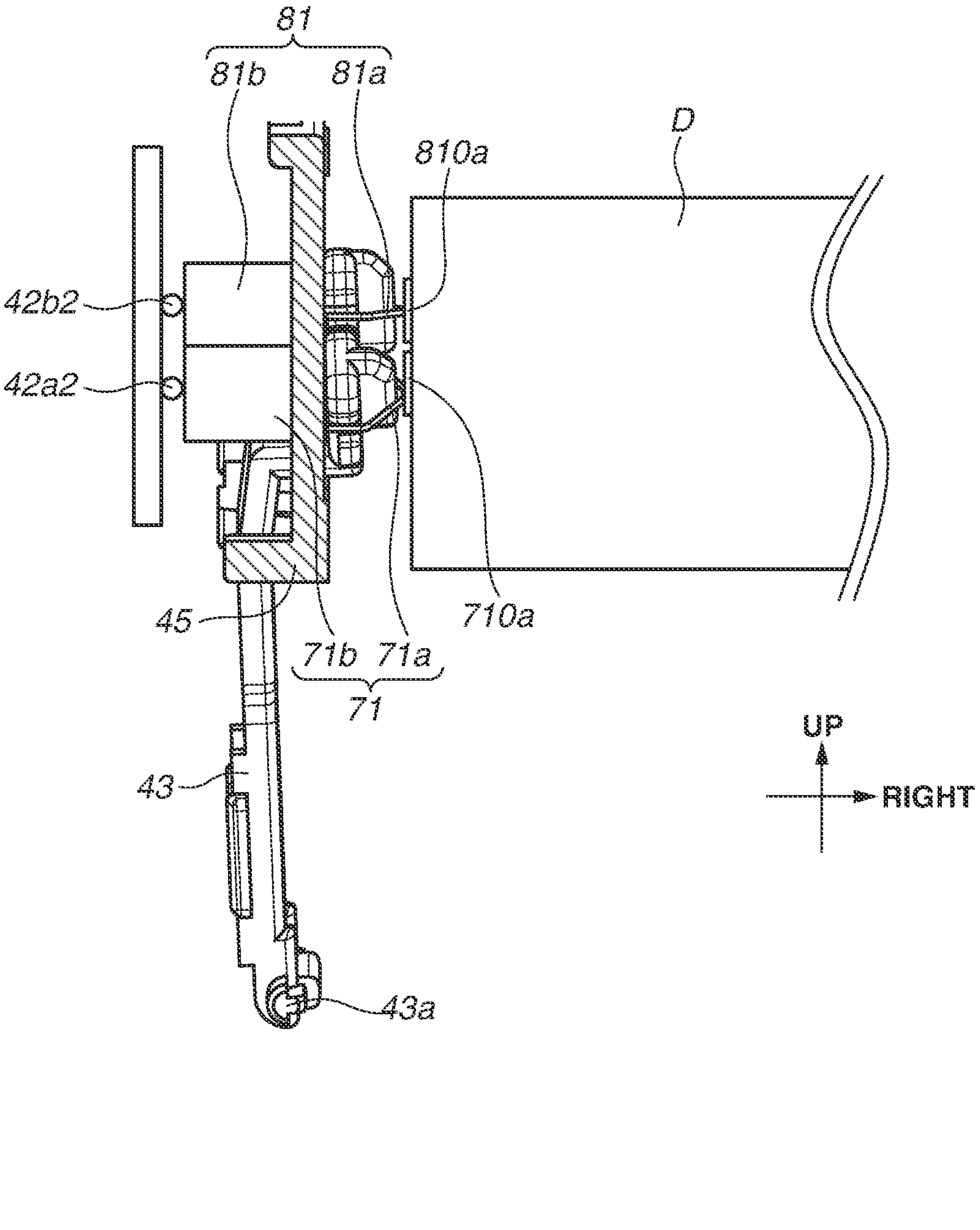
FIG. 15 is a front view of the main body electrical contacts and a developing unit when the holding member is at a contact position, according to the first exemplary embodiment.
Figure 16:
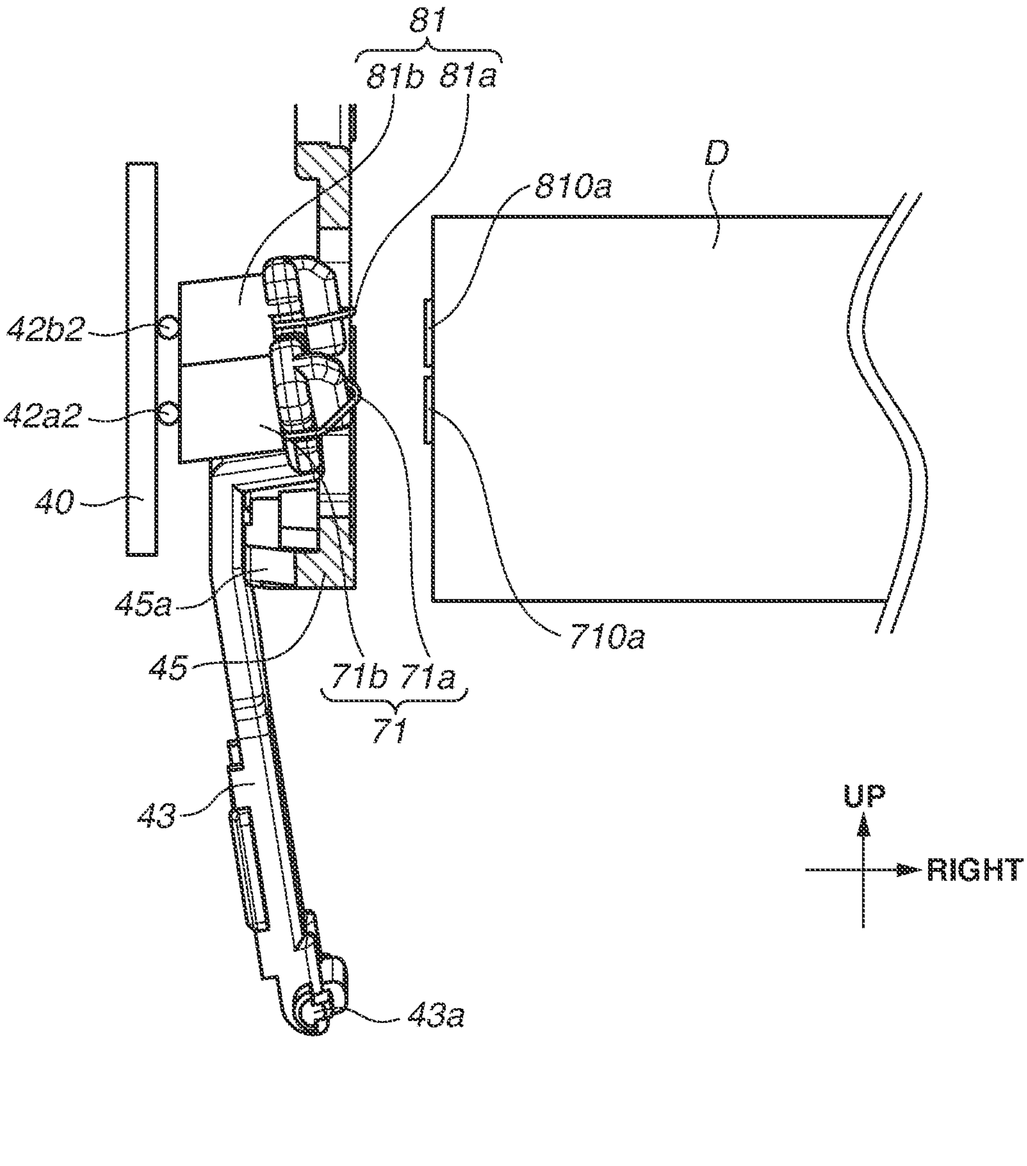
FIG. 16 is a front view of the main body electrical contacts and the developing unit when the holding member is at a separation position, according to the first exemplary embodiment.

The slide member 45 is a member for swinging the holding member 43. Relationship between the slide member 45 and the holding member 43 will be described with reference to FIGS. 14A to 14D, FIG. 15, and FIG. 16. FIG. 14A is a perspective view of the slide member 45 and the holding member 43 when the slide member 45 is at the downstream-side position. FIG. 14B illustrates a cross-section taken along line B-B in FIG. 14A. FIG. 14C is a perspective view of the slide member 45 and the holding member 43 when the slide member 45 is at the upstream-side position. FIG. 14D illustrates a cross-section taken along line C-C in FIG. 14C. FIG. 15 is a perspective view of the main body electrical contacts and the developing unit D when the holding member 43 is at a contact position at which the first main body electrical contact 81 and the second main body electrical contact 71 respectively come into contact with the developing electrical contact 810 and the blade electrical contact 710. FIG. 16 is a perspective view of the main body electrical contacts and the developing unit D when the holding member 43 is at a separation position at which the first main body electrical contact 81 and the second main body electrical contact 71 are respectively separated from the developing electrical contact 810 and the blade electrical contact 710.

When the slide member 45 is at the downstream-side position as illustrated in FIG. 14A, the holding member 43 is on the upstream of an inclined surface 45*a* and a restriction surface 45*b* of the slide member 45 in the attachment direction M as illustrated in FIG. 14B. Thus, the rotation of the holding member 43 is not restricted by the slide member 45. Accordingly, as illustrated in FIG. 15, the holding member 43 rotates such that the first bent portion 81*a* and the second bent portion 71*a* respectively come into contact with the first contact portion 810*a* and the second contact portion 710*a* by spring force of the first coil spring portion 81*b* and the second coil spring portion 71*b*. The position of the holding member 43 at this time is the contact position.

When the slide member 45 moves from the downstream-side position to the upstream-side position in conjunction with movement of the front cover 20 from the closing position to the opening position, the holding member 43 moves by the inclined surface 45*a* of the slide member 45 and comes into contact with the restriction surface 45*b* as illustrated in FIG. 14D. At this time, movement of the holding member 43 in a direction approaching the developing unit D is restricted by the slide member 45. As illustrated in FIG. 16, the holding member 43 is maintained at a position (separation position) at which the first bent portion 81*a* and the second bent portion 71*a* are respectively separated from the first contact portion 810*a* and the second contact portion 710*a*, against the spring force of the first coil spring portion 81*b* and the second coil spring portion 71*b*.

When the cartridge tray 35 mounted with the cartridge P is moved between the first position and the second position via the opening 200 with the front cover 20 at the open position, the holding member 43 is located at the separation position by the moving mechanism of the holding member 43 described above. Thus, in the state where the front cover 20 is located at the opening position, the first main body electrical contact 81 and the second main body electrical contact 71 do not respectively come into contact with the developing electrical contact 810 and the blade electrical contact 710 of the cartridge P. This makes it possible to smoothly move the cartridge tray 35 relative to the apparatus main body 100.

When the front cover 20 is moved from the opening position to the closing position, the holding member 43 is moved from the separation position to the contact position, and the first main body electrical contact 81 and the second main body electrical contact 71 respectively come into contact with the developing electrical contact 810 and the blade electrical contact 710 of each cartridge P. In such a manner, the image forming apparatus 1 is enabled to supply power to the developing roller 8 and the developing blade 7 of each cartridge P.

In the present exemplary embodiment, the ends of the main body electrical contacts are fixed to the holding member 43 by the holding portions of the holding member being press-fitting into the ends of the main body electrical contacts; however, the configuration is not limited thereto. Each of the main body electrical contacts and the corresponding holding portion may have a gap therebetween to the extent that the ends of the plurality of main body electrical contacts do not come into contact with one another.

In the present exemplary embodiment, the coil springs are used as the main body electrical contacts; however, the main body electrical contacts may be plate springs each formed of a thin metal plate.

In the present exemplary embodiment, the cartridges P are attached to and detached from the apparatus main body 100A by using the cartridge tray 35; however, the user may directly attach and detach the cartridges P to and from the apparatus main body 100A.

In the present exemplary embodiment, the process members to which power is supplied from the apparatus main body are the developing rollers and the developing blades; however, the process members are not limited thereto. In a case of using a cartridge provided with a toner supply roller which supplies toner to the corresponding developing roller, the toner supply roller is also the process member to which power is supplied from the apparatus main body.

In the present exemplary embodiment, the holding member is movable; however, the holding member may not be movable.

Figure 17:
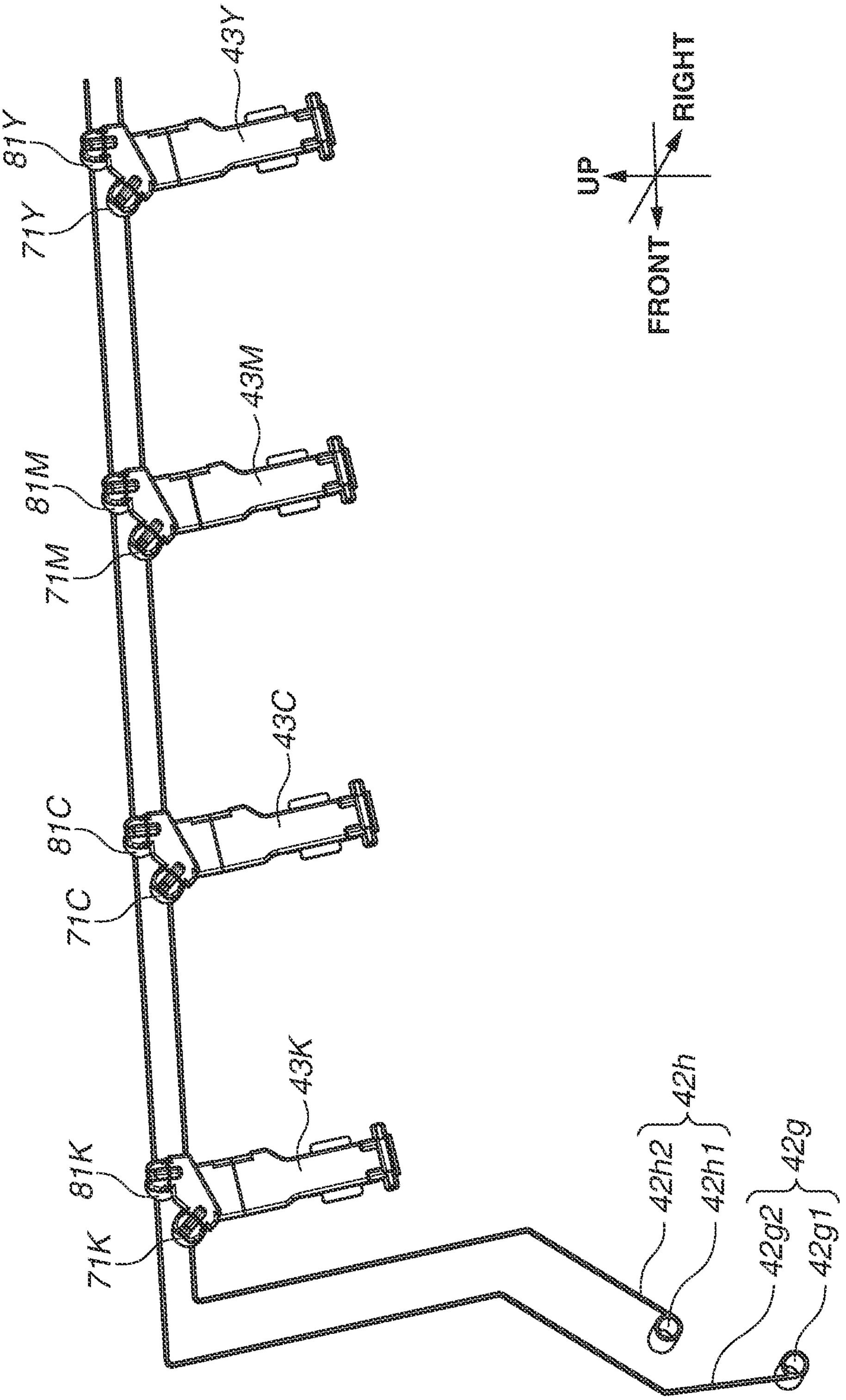
FIG. 17 is a perspective view of coils, main body electrical contacts, and holding members as viewed from a cartridge side, according to a second exemplary embodiment.

A second exemplary embodiment of the present disclosure will be described below. A configuration according to the present exemplary embodiment will be described. FIG. 17 is a perspective view of the coils 42, the main body electrical contacts, and the holding members as viewed from the cartridge P side.

In the first exemplary embodiment, the configuration in which the power having different magnitudes are suppliable to the developing unit D of black and the developing units D of yellow, magenta, and cyan has been described. In the present exemplary embodiment, a configuration in which power having the same magnitude is supplied to all of the developing units D of black, yellow, magenta, and cyan.

A coil 42*g* forms a part of the conductive path for supplying the same power to the developing rollers 8 of yellow, magenta, cyan, and black. A coil 42*h* forms a part of the conductive path for supplying the same power to the developing blades 7 of yellow, magenta, cyan, and black.

The coils 42*g* and 42*h* respectively include coil spring portions 42*g*1 and 42*h*1 each wound in a spiral shape at ends on the electric substrate 30 side. The coils 42*g* and 42*h* further include linear portions 42*g*2 and 42*h*2 extending from the coil spring portions 42*g*1 and 42*h*1, respectively. The coil spring portions 42*g*1 and 42*h*1 are in electrical contact with respective contacts (not illustrated) of the electric substrate 30 while being compressed.

The linear portion 42*g*2 of the coil 42*g* is in contact with the first main body electrical contacts 81Y, 81M, 81C, and 81K. The linear portion 42*h*2 of the coil 42*h* is in contact with the second main body electrical contacts 71Y, 71M, 71C, and 71K. The first main body electrical contact 81Y and the second main body electrical contact 71Y are held by the common holding member 43Y as in the first exemplary embodiment. Similarly, the first main body electrical contact 81M and the second main body electrical contact 71M are held by a common holding member 43M. The first main body electrical contact 81C and the second main body electrical contact 71C are held by a common holding member 43C. The first main body electrical contact 81K and the second main body electrical contact 71K are held by a common holding member 43K. The configurations of the first main body electrical contact 81 and the second main body electrical contact 71, and the holding method by the holding member 43 are the same as in the first exemplary embodiment.

Accordingly, as in the first exemplary embodiment, the distance between the first main body electrical contact 81 and the second bent portion 71*a* can be reduced. Thus, the present exemplary embodiment makes it possible to downsize the main body electrical contacts and the developing units D (cartridges P).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-090732, filed May 31, 2021, which is hereby incorporated by reference herein in its entirety.

What is claimed is:

1. An image forming apparatus, comprising:

an apparatus main body including an electric substrate, and a first main body electrical contact including a first coil spring portion and a second main body electrical contact including a second coil spring portion which are electrically connected to the electric substrate; and a cartridge configured to be attachable to and detachable from the apparatus main body, the cartridge including:

a first process member;

a second process member;

a first cartridge electrical contact electrically connected to the first process member; and a second cartridge electrical contact electrically connected to the second process member, wherein the apparatus main body includes a holding member holding both a first end portion of the first main body electrical contact on a cartridge side and a second end portion of the second main body electrical contact on a cartridge side so as not to cause the first end portion and the second end portion to be electrically connected to each other, and wherein the holding member is configured to move between a contact position and a separation position, the contact position being a position at which the first end portion contacts the first cartridge electrical contact by spring force of the first coil spring portion and the second end portion contacts the second cartridge electrical contact by spring force of the second coil spring portion, the separation position being a position at which the first end portion is separated from the first cartridge electrical contact so as not to comes into contact with the first cartridge electrical contact and the second end portion is separated from the second cartridge electrical contact so as not to comes into contact with the second cartridge electrical contact.

2. The image forming apparatus according to claim 1, wherein the first coil spring portion is a portion of the first main body electrical contact which is closer to the first cartridge electrical contact than to the electric substrate, and the first end portion is provided in the portion of the first coil spring portion on a side, and is configured to be brought into press contact with the first cartridge electrical contact by spring force of the first coil spring portion, and wherein the second coil spring portion is a portion of the second main body electrical contact which is closer to the second cartridge electrical contact than to the electric substrate, and the second end portion is provided in the portion of the second coil spring portion on a side of the cartridge, and is configured to be brought into press contact with the second cartridge electrical contact by spring force of the second coil spring portion.

3. The image forming apparatus according to claim 2, wherein the first coil spring portion is a compression coil spring portion wound in a spiral such that a spiral axis extends toward the first cartridge electrical contact, and the second coil spring portion is a compression coil spring portion wound in a spiral shape such that a spiral axis extends toward the second cartridge electrical contact.

4. The image forming apparatus according to claim 1, wherein the holding member is configured to swing between the contact position and the separation position about a swing axis, and wherein, in a longitudinal direction of the holding member, the holding member includes a holding portion holding the first end portion and the second end portion at one end of the holding member, and the swing axis is at the other end portion of the holding member.

5. The image forming apparatus according to claim 1, wherein the apparatus main body includes:

an opening through which the cartridge passes when the cartridge is moved to an image formation position at which image formation is performable by using the cartridge, the image formation position being inside the apparatus main body; and and an openable/closable member configured to be movable between an opening position at which the openable/closable member opens the opening and a closing position at which the openable/closable member closes the opening, and wherein the holding member is at the contact position when the openable/closable member is at the closing position, and is at the separation position when the openable/closable member is at the opening position.

6. The image forming apparatus according to claim 5, wherein the holding member is configured to move from the separation position to the contact position in conjunction with movement of the openable/closable member from the opening position to the closing position.

7. The image forming apparatus according to claim 1, wherein the holding member includes a first press-fitted portion and a second press-fitted portion, wherein the first end portion is a first bent portion obtained by a coil end being bent to form a convex curved portion facing the cartridge and is held by the holding member by the first press-fitted portion being press-fitted into an inside of the first bent portion, and wherein the second end portion is a second bent portion obtained by a coil end being bent to form a convex curved portion facing the cartridge, and is held by the holding member by the second press-fitted portion of the holding member being press-fitted into an inside of the second bent portion.

8. The image forming apparatus according to claim 1, wherein the first process member is a developing roller configured to carry toner.

9. The image forming apparatus according to claim 8, wherein the first cartridge electrical contact is made from conductive resin and includes a contact portion configured to come into contact with the first end portion, a bearing portion rotatably supporting the developing roller, and a connecting portion connecting the contact portion and the bearing portion with each other.

10. The image forming apparatus according to claim 9, wherein the second process member is a developing blade configured to regulate a layer thickness of toner carried on a surface of the developing roller, the developing blade including a metal plate which comes into contact with the developing roller, and a conductive supporting member supporting the metal plate.

11. The image forming apparatus according to claim 10, wherein the second cartridge electrical contact is made from conductive resin.

12. An image forming apparatus, comprising:

an apparatus main body including an electric substrate, and a first main body electrical contact and a second main body electrical contact which are electrically connected to the electric substrate; and a cartridge configured to be attachable to and detachable from the apparatus main body, the cartridge including:

a first process member;

a second process member;

a first cartridge electrical contact electrically connected to the first process member; and a second cartridge electrical contact electrically connected to the second process member, wherein the apparatus main body includes a common holding member holding a first end portion of the first main body electrical contact on a side and a second end portion of the second main body electrical contact on a side so as not to cause the first portion end and the second end portion to be electrically connected to each other, wherein the first end portion and the second end portion are configured to come into contact with the first cartridge electrical contact and the second cartridge electrical contact, respectively, wherein the holding member includes a first press-fitted portion and a second press-fitted portion, wherein the first end portion is a first bent portion obtained by a coil end being bent to form a convex curved portion facing the cartridge and is held by the holding member by the first press-fitted portion being press-fitted into an inside of the first bent portion, and wherein the second end portion is a second bent portion obtained by a coil end being bent to form a convex curved portion facing the cartridge and is held by the holding member by the second press-fitted portion being press-fitted into an inside of the second bent portion.

13. The image forming apparatus according to claim 12, wherein the first process member is a developing roller configured to carry toner.

14. The image forming apparatus according to claim 13, wherein the first cartridge electrical contact is made from conductive resin and includes a contact portion configured to come into contact with the first end portion, a bearing portion rotatably supporting the developing roller, and a connecting portion connecting the contact portion and the bearing portion with each other.

15. The image forming apparatus according to claim 14, wherein the second process member is a developing blade configured to regulate a layer thickness of toner carried on a surface of the developing roller, the developing blade including a metal plate which comes into contact with the developing roller, and a conductive supporting member supporting the metal plate.

16. The image forming apparatus according to claim 15, wherein the second cartridge electrical contact is made from conductive resin.

17. The image forming apparatus according to claim 1, wherein when the holding member is at the separation position, the first end portion is separated from the first cartridge electrical contact in a longitudinal direction of the first process member, and the second end portion is separated from the second cartridge electrical contact in the longitudinal direction.

18. The image forming apparatus according to claim 4, wherein the cartridge is moved from an outside of the apparatus main body to an inside of the apparatus main body in a movement direction, wherein the swing axis extends in the movement direction.

19. The image forming apparatus according to claim 4, wherein the swing axis extends in a direction intersecting with a longitudinal direction of the first process member and a gravity direction.

* * * * *